United States Patent [19]

Spelsberg

[11] 4,451,362  
[45] May 29, 1984

[54] FILLING FOR PERCOLATING FILTERS FOR BIOLOGICAL WASTE WATER PURIFICATION

[75] Inventor: Hans-Hugo Spelsberg, Osnabruck, Fed. Rep. of Germany

[73] Assignee: Felix Schoeller, Jr., GmbH & Co., KG, Osnabruck, Fed. Rep. of Germany

[21] Appl. No.: 467,258

[22] Filed: Feb. 17, 1983

Related U.S. Application Data

[63] Continuation-in-part of Ser. No. 277,114, Jun. 25, 1981, abandoned.

[30] Foreign Application Priority Data

Dec. 19, 1980 [DE] Fed. Rep. of Germany ....... 3047967

[51] Int. Cl.³ .......................... B01D 39/04; C02F 3/04
[52] U.S. Cl. .................................. 210/150; 210/505; 261/DIG. 72
[58] Field of Search ............... 210/150, 151, 615, 503, 210/508, 505, 798; 261/DIG. 72

[56] References Cited

U.S. PATENT DOCUMENTS

| | | | |
|---|---|---|---|
| 3,238,124 | 3/1966 | Burton | 210/150 |
| 3,407,935 | 10/1968 | Burton | 210/151 |
| 4,088,571 | 5/1978 | Helgesson | 210/150 |
| 4,167,482 | 9/1979 | Müller | 210/503 |
| 4,181,604 | 1/1980 | Onishi et al. | 210/622 |
| 4,219,420 | 8/1980 | Müller | 210/798 |

FOREIGN PATENT DOCUMENTS

| | | | |
|---|---|---|---|
| 54-149263 | 11/1979 | Japan | 210/150 |
| 743695 | 6/1980 | U.S.S.R. | 210/615 |

Primary Examiner—Benoit Castel
Attorney, Agent, or Firm—Lockwood, Dewey, Alex & Cummings

[57] ABSTRACT

A filling for a percolating filter for biological purification of waste water includes a plurality of flexible, irregularly touching, randomly arranged plastic strips up to 8 cm in width and several meters in length twisted together and suspended from a support over the height of the filter tank. The strips may have a maximum thickness of 30–100 μm and a minimum thickness of 10–60 μm, varying in such thicknesses over their width. The strips may be residue edge portion cuttings severed from the production of continuously produced sheet materials.

18 Claims, 15 Drawing Figures

U.S. Patent May 29, 1984 4,451,362
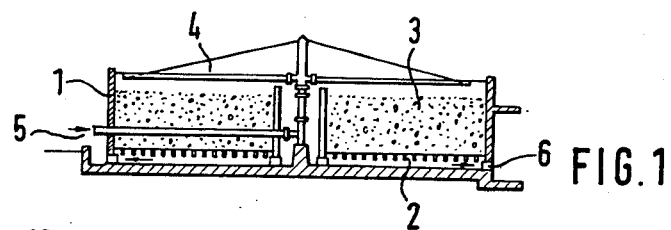
FIG.1
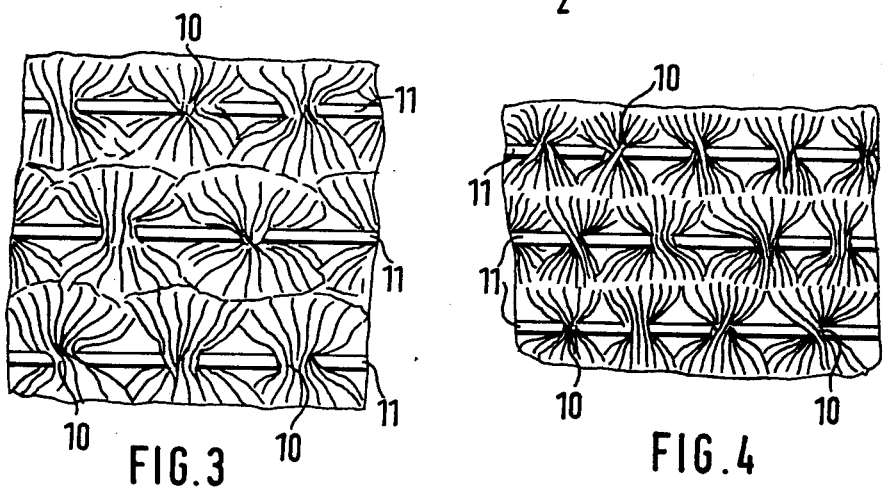
FIG.3  FIG.4
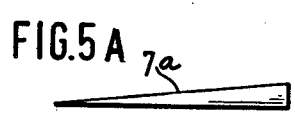
FIG.5A
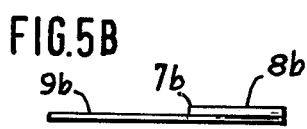
FIG.5B
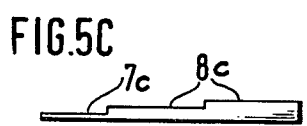
FIG.5C
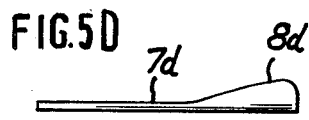
FIG.5D
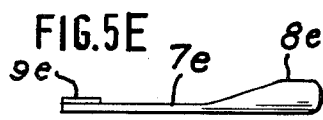
FIG.5E
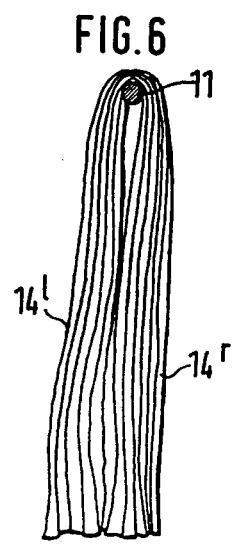
FIG.6
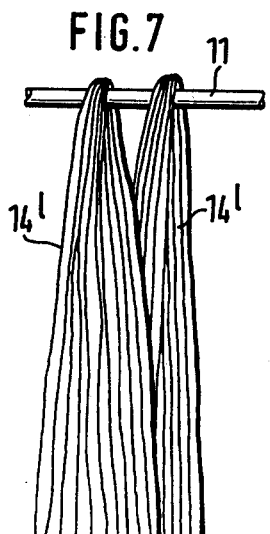
FIG.7
FIG.5F
FIG.5G
FIG.5H FIG. 2
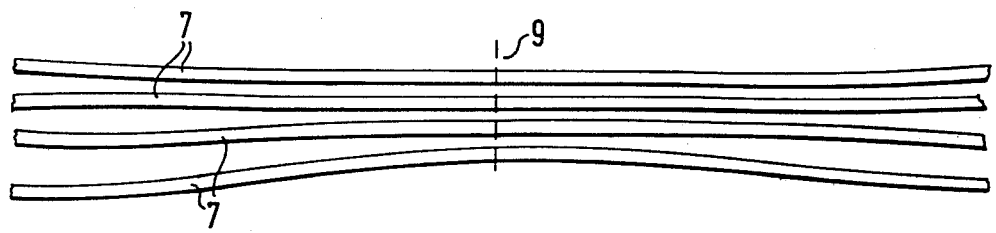
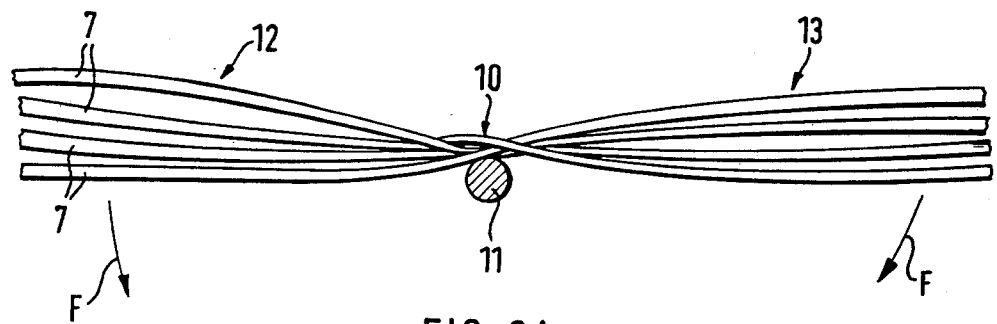
FIG. 2A

FILLING FOR PERCOLATING FILTERS FOR BIOLOGICAL WASTE WATER PURIFICATION

RELATED APPLICATIONS

This application is a continuation-in-part of copending application Ser. No. 277,114, filed June 25, 1981, now abandoned.

BACKGROUND AND SUMMARY OF THE INVENTION

This invention relates to a suspended filling for percolating filters for biological waste water purification.

It is known that percolating filters may be made which are filled with a wide variety of chip or fragment shaped materials. Such chip or fragment materials which constitute the filling may, for example, be scorified lava or polymeric elements of a wide variety of shapes. A disadvantage of such percolating filters is the high risk of clogging. Therefore, percolating filters comprising tubular or honeycombed structures have been developed which combine shorter throughput times with a lower risk of clogging. However, even such percolating filters are not without their disadvantages.

Where tubular structures are employed, water droplets can fall through freely. Honeycombed plate structures fit into the percolating filter also present difficulties, because the packets have to be supported in several layers by separate supporting structures on account of their low load bearing capacity. If the layers are not separately supported, but instead the packets are stacked one upon another, an increased risk of blockage occurs at the contact points. Moreover, the replacement of damaged parts requires a great deal of labor.

It is furthermore known to make percolating filters from long, suspended sheets of polymers. Such polymers or plastic sheets can, according to DP No. 1,759,102, have undulating or zigzag shaped partial surfaces to improve their efficiency. By an oppositely oriented arrangement of the deformations in adjacent sheets, a network of contact points results which not only prevents free fall of water droplets through the filter and sticking together of the sheets over large areas, but also repeatedly breaks up the laminar flow of water running down the sheet surfaces. Such suspended fillings are virtually free of clogging. A disadvantage of percolating filters comprising such hanging sheets is, however, in spite of the different possible forms, the limited effective surface per unit volume which exists in conventional commercial sheet structures of between 100 and 500 $m^2/m^3$.

A disadvantage of all the known percolating filter fillings is, furthermore, their lack of variability. Each type of filling has a specific effective surface. The waste waters to be purified, by contrast, vary considerably according to the type and quantity of nutrient content. The available percolating filter volume is, therefore, in many cases, not utilized to the optimum on account of the rigid geometrical form of the filling materials.

The use of suspended bark strips for the purification of waste water is also known from U.S. Pat. Nos. 3,238,124 and 3,407,935. These bark strips are obtained during the debarking of tree trunks. They offer the advantage that the bacteria cultures necessary for the biological purification are well anchored and do not slide off because of the rough surface of the bark strips. However, a definite disadvantage of the bark strips is their low stability, since the usual bacteria used for waste water purification also attacks bark. The bark strips, therefore, rot away within two years.

Other strip shaped materials are known as filter constituents for the purification of gas streams from U.S. Pat. No. 4,167,482. This patent discloses relatively short strips which have a mechanical filtering effect due to tight packing.

When strips are used in biological purification towers, the strip fill frequently becomes quickly plugged due to the bacterial growth on the strips. When the flow of air directed against the downward-flowing water is impaired or becomes impossible due to such growth, the system becomes blocked, does not remain aerobic and, thus, loses its purification ability.

With a less dense packing of the strips, the clogging and change from aerobic to at least partially anaerobic operation can be prevented. However, where the strips are smooth, they tend to adhere or cling to each other resulting in the creation of rather large channels through which the waste water can run without having been clarified.

The task underlying the present invention, as compared therewith, is the creation of a filling for percolating filters which does not suffer the aforementioned disadvantages, does not have a tendency to clog, adhere or produce channeling, is economical to manufacture, requires low maintenance and is long lasting and, in particular, possesses an effective surface area per unit of volume which can be variably adjusted from very low to very high values.

In the present invention a filling material comprises flexible, irregularly touching and randomly arranged strips of polymer or plastic which vary between maximum and minimum thickness across their width and which are formed into bundles and suspended over support bars intermediate their ends.

The strips may be as wide as 8 cm. The maximum thickness may be 30-100 $\mu$m and the minimum thickness 10-60 $\mu$m. The strips preferably have differing cross-sectional shapes and may have a length of several meters. Preferably the strips have such a length that when the bundle is centrally suspended it reaches from its point of suspension to the vicinity of the lower end of the percolating filter, i.e. as far as the floor of the percolating filter. To form one bundle according to the percolating filter dimensions or the desired density of the suspended bundles, a corresponding number of strips are combined together and centrally twisted or rotated. This twisted point constricts the bundle at the center, so that a substantially or virtually round central portion results which can be secured against untwisting or opening by gluing, stitching or sewing. Instead of twisting, the bundle can also be plaited, glued, fused or otherwise joined together at the center, so that a short portion results by which the bundle can be hung over the support bar such that one half of each of the bundles hangs down to the left and right, respectively, of the support bar. In a simple embodiment the strips may also be merely laid over the support bars.

The strips preferably comprise a material which does not rot or decay or does so only with great difficulty, for example of plastics of an organic type, such as polyethylene, polypropylene or PVC or the like. Other materials may also be included in the strips, for example cellulose or glass fibers.

Indeed, the strips may be waste products from a manufacturing process in which wide area sheets of polymeric or plastic material are continuously produced and then trimmed on both sides, so that endless strips of a few centimeters width result in production. As a result of such production of the filling or strips, the strips may be wedge- or step-shaped in cross-section or of other non-uniform thickness cross-section. It has been found that such stepped, wedge-shaped or other non-uniform thickness cross-sectioned forms have special advantages. Because of such shape, the strips hang in a disordered and irregular manner when they are suspended on account of the unique stresses in the material which causes them to turn or curl upon themself along their length. As a result, enough hollow spaces are always present to insure that air will flow through the filter during the purification process, yet channels will not develop which might allow unpurified waste water to flow through the filter without being purified. Morever, because the strips hang in such irregular manner due to the curl or twist imparted by these stresses, the number of contact points are substantially increased to prevent the bacterial growth from slipping off the strips, even though the strip surfaces may be smooth. Yet, excessive bacterial growth which might otherwise clog the filter will be released under its own weight with such curled non-uniform cross-sectioned strips to, in effect, provide a self-cleaning mechanism.

The support bars for the strips are, likewise, preferably formed of a material which is resistant to corrosion and are placed on the upper edges of the percolating filter or on special built-in components which are disposed in the percolating filter. These bars extend substantially radially in the case of a round or polygonal percolating filter, and parallel to the lateral edges in the case of rectangular or square percolating filters in plan. The cross-section of the support bars can be of any desired form.

The invention will now be explained in more detail with reference to examples of embodiments thereof illustrated in the drawing.

BRIEF DESCRIPTION OF THE DRAWINGS

In the course of this description, the drawings will frequently be referred to in which:

FIG. 1 is a cross-section through a percolating filter for biological waste water purification of general construction and circular cross-section;

FIG. 2 shows a number of strips formed in accordance with the principles of the present invention lying adjacent to one another in preparation for filling the percolating filter;

FIG. 2A shows a number of strips as in FIG. 2 which have been combined to form a bundle for the filling with the center twisted over a support bar;

FIG. 3 is a plan view of a portion of filling for a percolating filter according to the principles of the present invention;

FIG. 4 is another plan view of filling of the present invention for a percolating filter;

FIGS. 5A–5H are end views of several strips suitable for use in the present invention showing several preferred cross-sectional shapes;

FIG. 6 is a view of the upper end of a bundle viewed in a direction transverse to the direction of the support bars for the strips; and FIG. 7 is a lateral view of two bundles hung over the support bar.

DESCRIPTION OF THE PREFERRED EMBODIMENTS

As shown in FIG. 1, a percolating filter comprises a cylindrical tank wall 1 and a base 2, the latter of which is frequently formed of individually formed blocks permeable to water on which the filling 3 of the percolating filter rests or is heaped. In the example illustrated, the filling is composed of fragments of large size onto which the waste water is sprinkled by means of a revolving sprinkler 4 which is supplied by a conduit 5. The biologically purified waste water flows out of the filter at outlet 6.

The filling of the percolating filter of the present invention comprises individual strips 7 of which four are illustrated lying adjacent to one another in FIG. 2. The strips 7 may have a width of up to 8 cm and are several meters long so that, when they are suspended in the percolating filter, they fill it up and extend down to just above its base 2.

The strips 7 may be of any one of a number of different shapes in cross-section, as shown in FIGS. 5A–5H. The one thing that they preferably have in common is that the thickness of the strips vary between maximum and minimum thicknesses across the width of the strips over the length of the strips between the longitudinal edges thereof so that, when they hang, unique stresses are set up in the strip material which causes them to hang in a random irregular manner due to the strips curling or twisting upon themselves along their length.

In the strips 7a–7d shown in FIGS. 5A–5D, each of the strips varies in thickness in such manner that the maximum thickness is at or adjacent one of the longitudinal edges and the minimum thickness is at or adjacent the opposite longitudinal edge.

The strip 7a shown in FIG. 5A is wedge-shaped in cross-section having its maximum thickness at the right side of the strip with the thickness varying substantially constantly from right to left.

The strip 7b shown in FIG. 5B is stepped in cross-section and is formed of two layers, which are bonded together, a narrower upper layer 8b and a wider lower layer 9b. Strip 7b may be formed as the edge trimming of larger sheets in which two sheets of unequal width have been adhesively bonded or otherwise fixed together.

The strip 7c as shown in FIG. 5C is also step-shaped in cross-section having a plurality of steps 8c with the maximum thickness, again, being located at or adjacent to the right hand longitudinal edge of the strip 7c and the minimum thickness at or adjacent to the left hand longitudinal edge of the strip. This stepped form may be obtained as a waste product from the production of a sheet shaped material which is produced by the coating of one or more layers of a molten, polymeric or plastic material on a support material.

The strip 7d shown in FIG. 5D includes an increased thickness bead 8d at or adjacent the right hand longitudinal edge of the strip. The bead 8d may be formed during extrusion of wider sheets through a wide aperture extrusion nozzle. In such nozzle, a necking in phenomenon frequently occurs at the edges of the nozzle which results in a thickening of the sheet which is being extruded at that location. These increased thickness edges are usually trimmed following extrusion and the trimmed sheet edge will result in the cross-section shown in FIG. 5D.

The strip 7e shown in FIG. 5E is similar to the strip 7d in that it includes the increased thickness bead portion 8e at or adjacent to the right longitudinal edge of the strip. The strip 7e, however, also includes a narrow thin second layer 9e at or adjacent to its left hand edge. Again, this strip may be formed as described with respect to FIGS. 5B and 5D.

In FIGS. 5F and 5G, strips are shown in which the increased thickness portion is spaced from the longitudinal edges of the strip. The strip 7f in FIG. 5F includes a relatively elongate increased maximum thickness portion 8f toward its center, while the strip 7g in FIG. 5G includes an increased maximum thickness portion 8g adjacent its center which is narrower than the increased thickness portion 8f, but is of greater thickness. The strips 7f and 7g may be formed either from waste material or otherwise by longitudinally rolling or otherwise pressing the strip material to form the portions of differing thickness across the width of the strip.

Finally, a strip 7h is shown in FIG. 5H comprising two layers similar to that shown in FIG. 5B, but in which a narrower width layer 8h is superimposed on a wider layer 9h adjacent the center of the wider layer.

Such strips of, for example, 5 cm width and 6 m length, are combined to form a bundle as shown in FIG. 2, by joining together a number of strips, for example 20 or 30. The broken line 9 in FIG. 2 illustrates the center of the bundle of strips 7, which may extend still further toward the left and right. At the center 9, the bundle may be twisted together at 10 as shown in FIG. 2A so that a rope-like structure results. After twisting, the bundle is suspended for filling the percolating filter according to FIG. 1 over a support bar 11 which, in turn, is suspended by its ends at suitable positions in the percolating filter so that, if the two halves 12 and 13 as shown in FIG. 2A are released, they fall down in the direction of the arrow F and assume the position shown in FIG. 6. Although not clearly shown in FIGS. 6 and 7, the strips in the bundle halves which hang down will also curl or twist upon themselves in the manner previously described due to their non-uniform cross-sectional thicknesses. The strips extend a considerable distance further downward, in order to provide realistic and relative proportions. A disordered random hanging of the strips results which may be further twisted and turned with one another or within themselves by their construction or form, so that the risk of falling or resting of one upon another is completely eliminated. The bundle comprising the individual strips bears the reference numerals 14l and 14r in FIGS. 6 and 7 to denote left and right respectively. If a number of such bundles 14l and 14r suspended over support bars 11 are used as filling for a percolating filter, the patterns shown in FIGS. 3 and 4 are obtained.

In FIG. 3, 11 again denotes the support bar and 10 the twist, whereby on account of the arrangement and position of the filling bundles, only some twists can be given the reference 10 in order not to render the diagram confusing. The same applies also to FIG. 4. If FIGS. 3 and 4 are compared, it is possible however, to see that in FIG. 4 the bundles are substantially nearer to one another and are pressed more closely together than in FIG. 3. This is intended to illustrate the facility for adaptation which results from the filling of the present invention, since a special advantage of the percolating filter filling of this invention is its variability. Where a filling according to FIG. 3 is used, a relatively low effective surface is obtained, whereas in a filling according to FIG. 4, a high effective surface is obtained which can be adapted according to the type of waste water, type of percolating filter and other conditions.

Particularly during the break-in phase of a percolating filter equipped with the filling of the invention, the effective surface to the incident water may be adjusted merely by pushing together or pulling apart the bundles of strips. In FIGS. 3 and 4, the change of the effective area by a factor of 2 is demonstrated. The two figures have been prepared from photographs. FIG. 4 contains twice the filling and, thus, twice the effective surface of FIG. 3. With the strip-shaped filling, the cleaning of the strips is also particularly uncomplicated and simple, which can be done from above the percolating filter in order to free the strips of algae and other deposited substances. This may be done, for example, by introducing a rod between the suspended bundles, moving the rod to and fro and, thus, mechanically causing the growth and deposits to fall off, whereupon the percolating filter is flushed through.

It will be understood that the embodiments of the present invention which have been described are merely illustrative of a few of the applications of the principles of the present invention. Numerous modifications may be made by those skilled in the art without departing from the true spirit and scope of the invention.

What is claimed is:

1. A filling for a percolating filter for the biological purification of waste water comprising:

a plurality of flexible, irregularly touching, randomly arranged hanging elongate strips, having a width of up to 8 cm and a length of several meters the thickness of said strips varying between maximum and minimum thicknesses across the width of said strips, said maximum and minimum thicknesses extending longitudinally of the strips between the longitudinal edges thereof and causing said strips to be stressed and curled; and means supporting said strips in said randomly arranged relationship and such that the longitudinal edges and the longitudinally extending maximum and minimum thicknesses of said strips extend substantially vertically and in the direction of flow of the waste water when the waste water is being purified.

2. The filling of claim 1, wherein said maximum thickness is adjacent one of the longitudinal edges of said strips.

3. The filling of claim 2, wherein said minimum thickness is adjacent the opposite longitudinal edge of said strips.

4. The filling of claim 2, wherein said strips are formed of plastic.

5. The filling of claim 2, wherein said means supports said strips intermediate the ends of the strips when said waste water is being purified.

6. The filling of claim 1, wherein said maximum thickness is spaced from the longitudinal edges of said strips and said minimum thickness is adjacent at least one of said longitudinal edges.

7. The filling of claim 5, wherein said strips are formed of plastic.

8. The filling of claim 5, wherein said means supports said strips intermediate the ends of the strips when said waste water is being purified.

9. The filling of claim 1, wherein said strips are formed of plastic.

10. The filling of claim 9, wherein said strips also include cellulose therein.

11. The filling of claim 1, wherein said means supports said strips intermediate the ends of the strips when said waste water is being purified.

12. The filling of claim 11, wherein said strips are joined together centrally of their ends.

13. The filling of claim 11, wherein said strips are joined by twisting them together.

14. The filling of claim 1, wherein said maximum thickness of said strips is about 30–100 μm and said minimum thickness is about 10–60 μm.

15. The filling of claim 1, wherein said strips are wedge-shaped in cross-section.

16. The filling of claim 1, wherein said strips are stepped in cross-section.

17. The filling of claim 1, wherein said strips are edge portion strips severed from the production of a continuously produced sheet material.

18. The filling of claim 1, wherein said strips are of a thermoplastic material, built-up from individually applied coatings.

* * * * *